(12) United States Patent
Keidar et al.

(10) Patent No.: US 9,779,262 B2
(45) Date of Patent: Oct. 3, 2017

(54) APPARATUS AND METHOD TO DECRYPT FILE SEGMENTS IN PARALLEL

(71) Applicant: QUALCOMM Incorporated, San Diego, CA (US)

(72) Inventors: Ron Keidar, San Diego, CA (US); Osman Koyuncu, San Diego, CA (US); Assaf Shacham, Zichron Yaakov (IL)

(73) Assignee: QUALCOMM Incorporated, San Diego, CA (US)

( * ) Notice: Subject to any disclaimer, the term of this patent is extended or adjusted under 35 U.S.C. 154(b) by 276 days.

(21) Appl. No.: 14/691,302

(22) Filed: Apr. 20, 2015

(65) Prior Publication Data

US 2017/0061144 A1 Mar. 2, 2017

(51) Int. Cl.
| | | |
|---|---|---|
| *G06F 9/00* | (2006.01) | |
| *G06F 9/24* | (2006.01) | |
| *G06F 15/177* | (2006.01) | |
| *G06F 21/62* | (2013.01) | |
| *G09C 1/00* | (2006.01) | |
| *H04L 9/06* | (2006.01) | |
| *G06F 21/57* | (2013.01) | |
| *G06F 21/60* | (2013.01) | |
| *G06F 21/72* | (2013.01) | |

(52) U.S. Cl.
CPC ........ *G06F 21/6218* (2013.01); *G06F 21/575* (2013.01); *G09C 1/00* (2013.01); *H04L 9/0618* (2013.01); *H04L 9/0637* (2013.01); *G06F 21/602* (2013.01); *G06F 21/72* (2013.01); *H04L 2209/12* (2013.01); *H04L 2209/125* (2013.01); *H04L 2209/24* (2013.01)

(58) Field of Classification Search
CPC ............. H04L 2209/24; H04L 2209/12; H04L 2209/125; H04L 9/0637; G06F 21/602; G06F 21/72; G06F 21/6218; G06F 21/575; G09C 1/00
See application file for complete search history.

(56) References Cited

U.S. PATENT DOCUMENTS

| | | |
|---|---|---|
| 8,108,641 B2 | 1/2012 | Goss et al. |
| 8,250,560 B2 | 8/2012 | Hirayama |
| 8,477,946 B2 | 7/2013 | Funk et al. |
| 8,850,177 B2 | 9/2014 | Brown et al. |

(Continued)

OTHER PUBLICATIONS

Akdemir K., et al., "White Paper Breakthrough AES Performance with Intel AES New Instructions", Jan. 1, 2010 (Jan. 1, 2010), pp. 1-12, XP055210880, Retrieved from: http://software.intel.com/sites/default/files/m/d/4/1/d/8/10TB24_Breakthrough_AES_Performance_with_Intel_AES_New_Instructions.final.secure.pdf.

(Continued)

*Primary Examiner* — Xuxing Chen
(74) *Attorney, Agent, or Firm* — BSTZ (57) ABSTRACT

Disclosed is a method and apparatus to decrypt file segments in parallel. In one embodiment, an integrated circuit may be used with a storage device of a computing device that comprises: a hardware interface to communicate with the storage device; a crypto-engine to encrypt file segments to be stored on the storage device and to decrypt file segments read from the storage device; and a processor. The processor may be configured to: read a plurality of decrypted file segments from the storage device through the crypto-engine in parallel; and to store the plurality of decrypted file segments.

22 Claims, 6 Drawing Sheets

(56) References Cited

U.S. PATENT DOCUMENTS

| | | | |
|---|---|---|---|
| 9,537,657 B1* | 1/2017 | Char | H04L 9/3226 |
| 2007/0237327 A1* | 10/2007 | Taylor | H04L 9/0662 |
| | | | 380/37 |
| 2009/0214026 A1* | 8/2009 | Gueron | H04L 9/0631 |
| | | | 380/29 |
| 2010/0128874 A1 | 5/2010 | Scott-Nash | |
| 2010/0306553 A1* | 12/2010 | Poletti, III | G06F 7/00 |
| | | | 713/189 |
| 2010/0332843 A1* | 12/2010 | Boivie | G06F 21/125 |
| | | | 713/189 |
| 2011/0113260 A1* | 5/2011 | Ma | G09C 1/00 |
| | | | 713/193 |
| 2011/0194693 A1* | 8/2011 | Izu | G06F 21/602 |
| | | | 380/255 |
| 2012/0250856 A1 | 10/2012 | Pasini et al. | |
| 2014/0082373 A1* | 3/2014 | Colnot | G06F 21/572 |
| | | | 713/193 |
| 2015/0074426 A1* | 3/2015 | Jean | G06F 12/1408 |
| | | | 713/193 |
| 2015/0149788 A1* | 5/2015 | Gupta | G06F 12/1408 |
| | | | 713/189 |

OTHER PUBLICATIONS

Biham E., "Fast New DES Implementation in Software", fast software encryption, international Workshop, Jan. 1, 1997 (Jan. 1, 1997), pp. 260-271, XP000923448.

Gueron S., et al., "Intel's New AES Instructions for Enhanced Performance and Security", Feb. 22, 2009 (Feb. 22, 2009), Correct System Design, [Lecture Notes in Computer Science, Lect.Notes Computer], Springer International Publishing, Cham, pp. 51-66, XP047343672, ISSN: 0302-9743, ISBN: 978-3-642-34221-9.

International Search Report and Written Opinion—PCT/US2016/024062—ISA/EPO—dated Jun. 24, 2016.

Diesburg S., et al., "A Survey of Confidential Data Storage and Deletion Methods", ACM Computing Surveys, vol. 3, No. 1, Jan. 11, 2010, XP055351942, pp. 1-37.

* cited by examiner

APPARATUS AND METHOD TO DECRYPT FILE SEGMENTS IN PARALLEL

BACKGROUND

Field

Embodiments relate generally to an apparatus and method to decrypt file segments in parallel.

Relevant Background

Traditionally, boot files are decrypted by a crypto-engine, after the file is fully assembled by the file system. An example of this, is a Unix File System (UFS), in which the driver and the crypto-engine are purely software implemented, which allows for parallel decryption. However, this implementation is not very secure, as compared to a hardware based crypto-engine implementation. Thus, utilizing current systems, which are purely software implemented, may allow for parallel reads to achieve maximum throughput, these types of systems lack the enhanced security of a hardware based crypto-engine implementation.

On the other hand, more secure types of hardware based crypto-engines have been proposed. A beneficial feature of a hardware based crypto-engine (CE) is speed. A hardware based CE is located in-line, meaning the CE processes the data as it goes.

This hardware based CE implementation is currently defined as requiring Cipher Block Chaining (CBC) or similar chaining modes that are selected by the storage specifications for encryption/decryption implementations. However, for the hardware based CE in-line mode, it is very inconvenient because the CBC implementation assumes the file is processed serially, while the in-line CE may operate as defined by the storage specifications in parallel (e.g., parallel read and decryption of different segments of the file). Strategies are being sought after to be able to decrypt and read hardware based crypto-engine encrypted files in a much more efficient manner.

SUMMARY

Aspects may relate to a method and apparatus to decrypt file segments in parallel. In one embodiment, an integrated circuit may be used with a storage device of a computing device that comprises: a hardware interface to communicate with the storage device; a crypto-engine to encrypt file segments to be stored on the storage device and to decrypt file segments read from the storage device; and a processor. The processor may be configured to: read a plurality of decrypted file segments from the storage device through the crypto-engine in parallel; and to store the plurality of decrypted file segments.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

As used herein, the term "computing system or device" refers to any form of programmable computer device including but not limited to laptop and desktop computers, tablets, smartphones, televisions, home appliances, cellular telephones, personal television devices, personal data assistants (PDAs), palm-top computers, wireless electronic mail receivers, multimedia Internet enabled cellular telephones, Global Positioning System (GPS) receivers, wireless gaming controllers, receivers within vehicles (e.g., automobiles), interactive game devices, notebooks, smartbooks, netbooks, mobile television devices, or any data processing apparatus.

Figure 1:
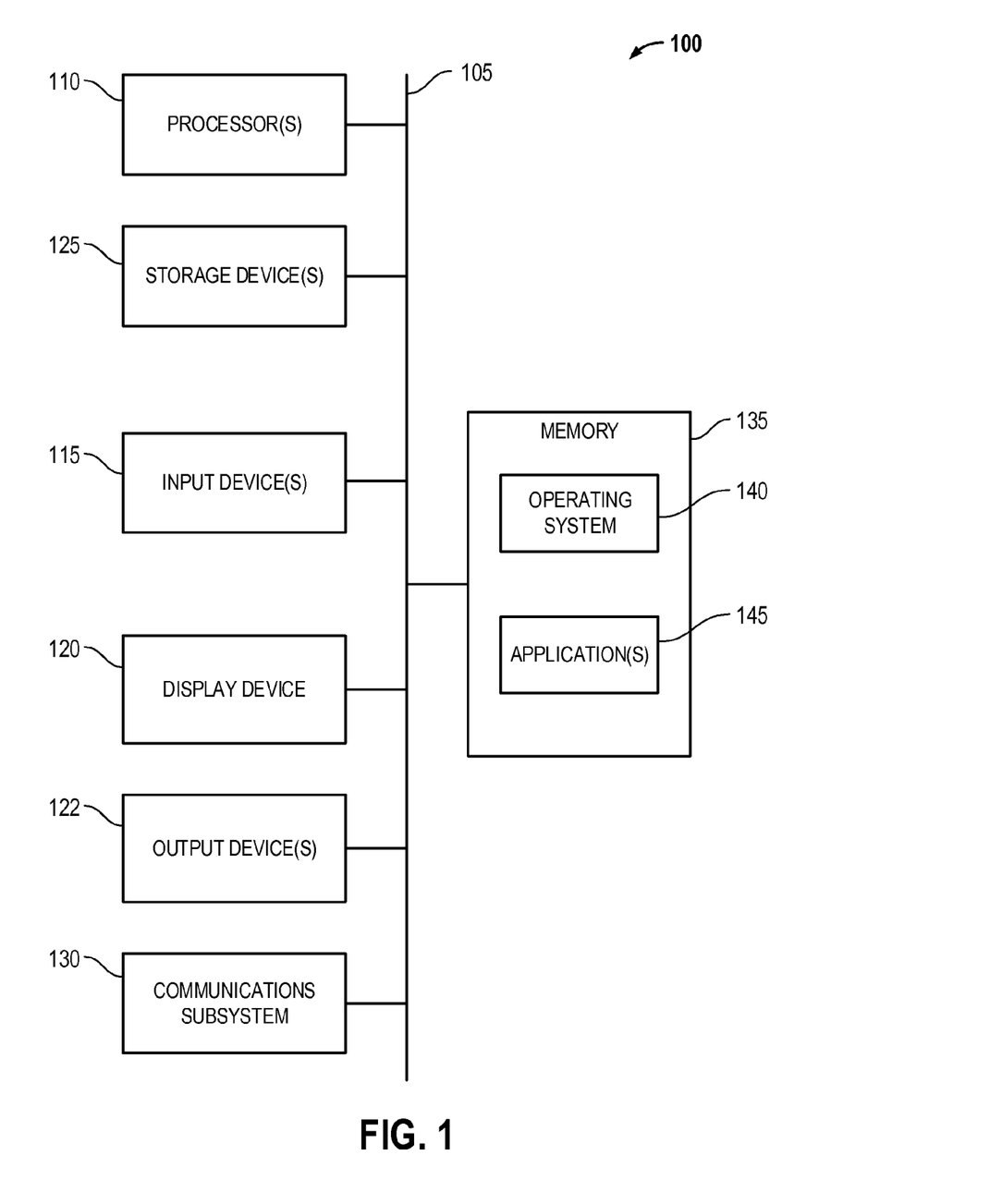
FIG. 1 illustrates a computing device where embodiments may be practiced.

An example computing device 100 adapted for methods to decrypt file segments in parallel is illustrated in FIG. 1. The computing device 100 is shown comprising hardware elements that can be electrically coupled via a bus 105 (or may otherwise be in communication, as appropriate). The hardware elements may include one or more processors 110, including without limitation one or more general-purpose processors and/or one or more special-purpose processors (such as digital signal processing chips, graphics acceleration processors, system on chips (SOCs), and/or the like); one or more input devices 115, which can include without limitation one or more sensors including an a mouse, a keyboard, keypad, gesture input device, microphone and/or the like; one or more display devices 120 which can include without limitation a display device, a touch screen, a monitor, and/or the like; and one or more output devices 122 which can includes a speaker, a printer, and/or the like.

The computing device 100 may further include (and/or be in communication with) one or more non-transitory storage devices 125, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The computing device 100 may also include a communication subsystem 130, which can include without limitation a modem, a network card (wireless or wired), an infrared communication device, a wireless communication device and/or chipset (such as a Bluetooth device, an 802.11 device, a Wi-Fi device, a WiMax device, cellular communication devices, etc.), and/or the like. The communications subsystem 130 may permit data to be exchanged with a network, other computing devices, and/or any other devices described herein. In one embodiment, the computing device 100 may further comprise a working memory 135, which can include a RAM or ROM device, as described above. It should be appreciated that computing device 100 may be a mobile device or a non-mobile device, and may have wireless and/or wired connections.

The computing device 100 may also comprise software elements, shown as being currently located within the working memory 135, including an operating system 140, device drivers, executable libraries, and/or other code, such as one or more application programs 145, which may comprise or may be designed to implement methods, and/or configure systems, provided by embodiments, as will be described herein. Merely by way of example, one or more procedures described with respect to the method(s) discussed below might be implemented as code and/or instructions executable by computing device 100 (and/or a processor 110 within computing device 100); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 125 described above. In some cases, the storage medium might be incorporated within a computing device, such as the system 100. In other embodiments, the storage medium might be separate from a computing device (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computerized computing device 100 and/or might take the form of source and/or installable code, which, upon compilation and/or installation on the computing device 100 (e.g., using any of a variety of generally available compilers, installation programs, compression/decompression utilities, etc.), then takes the form of executable code.

In some embodiments, the crypto-engine hardware is capable of reading multiple segments in parallel, but the decryption techniques as set forth by storage specification may require serialization using CBC or a similar mode, so once decryption is enabled, the crypto-engine hardware parallel read capability may not be useful. Therefore, in one embodiment, aspects may relate to an integrated circuit, such as a system on a chip (SOC), for use with a storage device 125 of a computing device 100 in which a crypto-engine is hardware based and the SOC may implement a hardware and/or software driver to read decrypted file segments in a parallel fashion. For example, the driver may be a software program that reads all of the decrypted file segments in a parallel fashion and attaches them together. As one example, each file segment may be decrypted by the hardware-based crypto-engine at the hardware driver interface using an initialization vector of zero, or any suitable number, for any file segment, except for the first file segment. Putting zero in the initialization vector, in essence, makes the first decryption block (e.g., 16 bytes), "wrong" for every segment. Then, when the driver stitches the file segments together for storage in memory 135, the driver may XOR the last block of each file segment with the first block of the next segment and overwrite the results in the first block of the next segment. In this way, this procedure fixes the "wrong" pieces. By utilizing this procedure, all of the file segments are decrypted and read in parallel such that they can be stored in memory in a very efficient manner. This may be utilized, as an example, to allow for a secure boot decryption operation for an application 145 to be utilized at the full speed that the hardware driver interface can provide. It should be appreciated that the initialization vector (IV) may be set to zero, or any predefined number or suitable number, which is not based on the result of data read from the previous segment.

Figure 2:
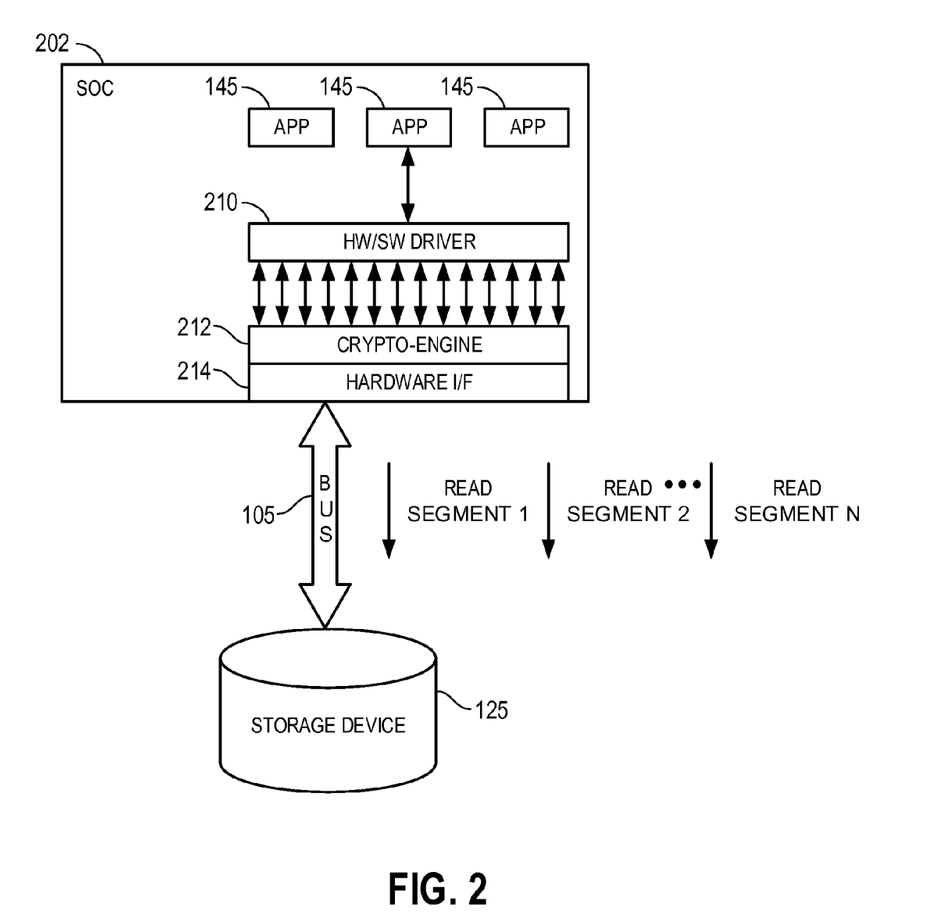
FIG. 2 illustrate a system on a chip (SOC) for use with a storage device of a computing device where embodiments may be practiced.

With additional reference to FIG. 2, an example integrated circuit, such as a system on a chip (SOC) 202, for use with a storage device 125 of computing device 100, will be described. It should be appreciated that an SOC is provided merely as an example of an integrated circuit that may be utilized to implement aspects of the disclosure to be hereinafter described in more detail, and that any type of integrated circuit may be utilized. It should be appreciated that SOC 202 may be implemented as part of the previously-described computing device 100, in which one of the processors 110 is implemented with the SOC 202, to implement aspects to be hereinafter described. In particular, SOC 202 in corporation with a processor 110 (external or internal to the SOC) may implement various applications 145 as well as a software/hardware driver 210, a hardware-based crypto-engine 212, and a hardware interface 214 which may communicate through bus 105 with a storage device 125. It should be appreciated that any type of integrated circuit, SOC, processor, application specific integrated circuit (ASIC), field programmable gate array (FPGA) or other programmable logic device, discrete gate or transistor logic, discrete hardware components, or any sort of logic, or any combination thereof, may be utilized to perform the functions to be hereinafter described.

In one embodiment, crypto-engine 212 may be used to encrypt files segments to be stored on storage device 125 and to decrypt file segments read from storage device 125. Further, SOC 202 operating in cooperation with a processor to implement driver 210 may: read a plurality of decrypted files segments from storage device 125 that are decrypted by crypto-engine 212 in parallel and then store the plurality of decrypted file segments into memory 135 for use in booting an application 145. As a particular example, the plurality of decrypted file segments may be read by driver 210 to initiate a secure boot decryption operation for an application 145 in order to boot the application 145 for usage. Further, it should be appreciated that the previously described storage device 125 may be a disk drive, a flash memory, or any suitable type of storage device for a mobile or non-mobile computing device. Also, driver 210 may be in parallel communication with crypto-engine 212. As can be seen in FIG. 2, a plurality of read file segment commands (e.g., read file segment 1 . . . read file segment N) may be commanded via bus 105 to storage device 125, as will be described in more detail hereafter.

Additionally, as will be described in more detail hereafter, SOC 202 in cooperation with a processor may be further configured to read a last block of a previously encrypted file segment and to XOR the last block of the previously read encrypted file segment with a first block of a next decrypted file segment and to overwrite the first block of the next decrypted file segment to create a fixed decrypted file segment. The fixed decrypted file segment may then be stored in a memory 135. In order to accomplish this, a first initialization vector for a first file segment to be decrypted may be utilized and initialization vectors for subsequent file segments to be decrypted may be set to zero. Examples of these implementations will be hereinafter described in more detail. In particular, the fixed decrypted file segments may be stitched together and stored in a memory 135 in a parallel and time efficient manner such that a secure boot operation for an application 145 can be quickly performed to launch an application.

Figure 3:
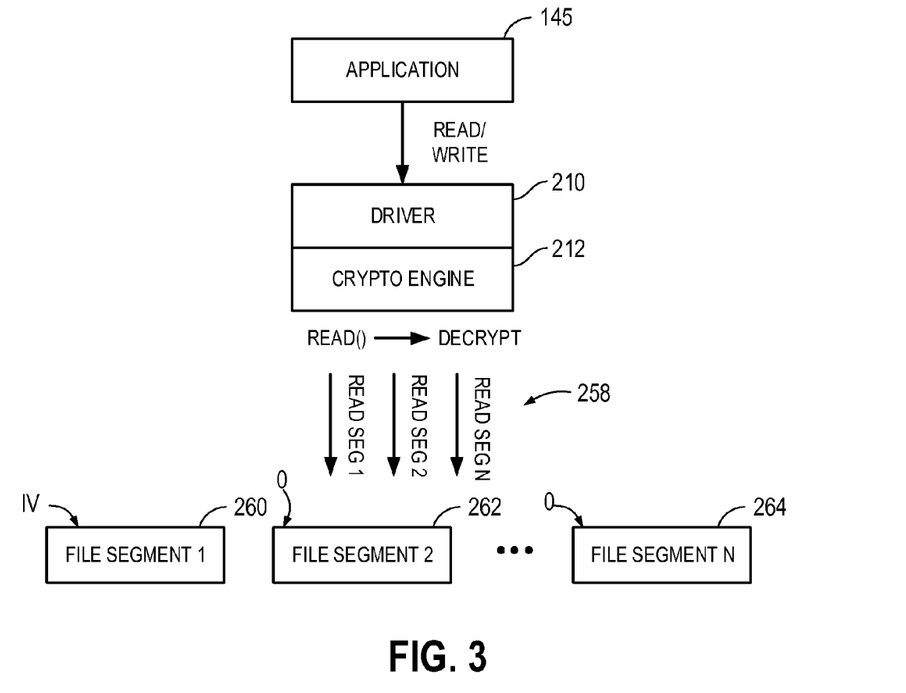
FIG. 3 illustrates an example of decryption/read operations.

With brief additional reference to FIG. 3, an example of decryption/read operations will be described. As previously described, an application 145 operating in cooperation with SOC 202 may want to initiate a secure boot decryption operation which requires a plurality of decryption and read operations to be performed. Driver 210 may be configured to read a plurality of decrypted file segments from the storage device through the crypto-engine 212, in parallel, and then store the plurality of decrypted file segments into memory 135 for use in a secure boot decryption operation for an application 145. Crypto-engine 212 decrypting, in parallel, the encrypted file segments stored by the storage device 125. As an example, as can be seen in FIG. 3, a plurality of decryption and read commands 258 are commanded such that file segment 1 260, file segment 2 262, and file segment N 264 are decrypted and read. As shown in FIG. 3, it should be noted that, instead of chaining the decryptions and reads of the file segments 1-N, that these operations are performed in parallel. Further, as will be described in more detail, a standard first initialization vector (IV) for the first file segment 260 to be read and decrypted is utilized. However, the initialization vectors for the subsequent file segments (e.g. file segment 2 ... file segment N 262 ... 264) are set to 0.

Figure 4:
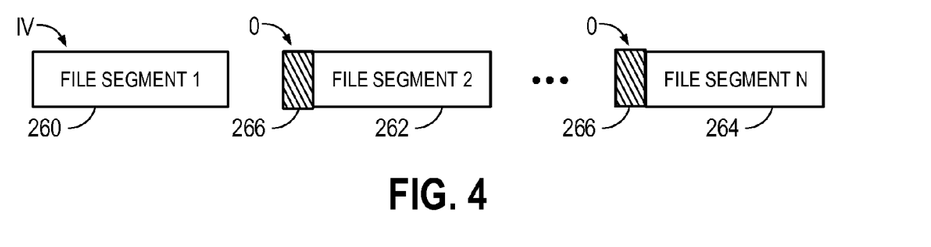
FIG. 4 illustrates an example of file segments.

With brief additional reference FIG. 4, it should be noted that the initialization vector (IV) is standard for the first file segment 260, whereas the initialization vector of the subsequent file segments 2-N 262, 264 are set to 0 such that a carry-over (e.g., of the first 16 bytes) of a block of every subsequent file segment is broken. This can be shown by blocks 266.

Figure 5:
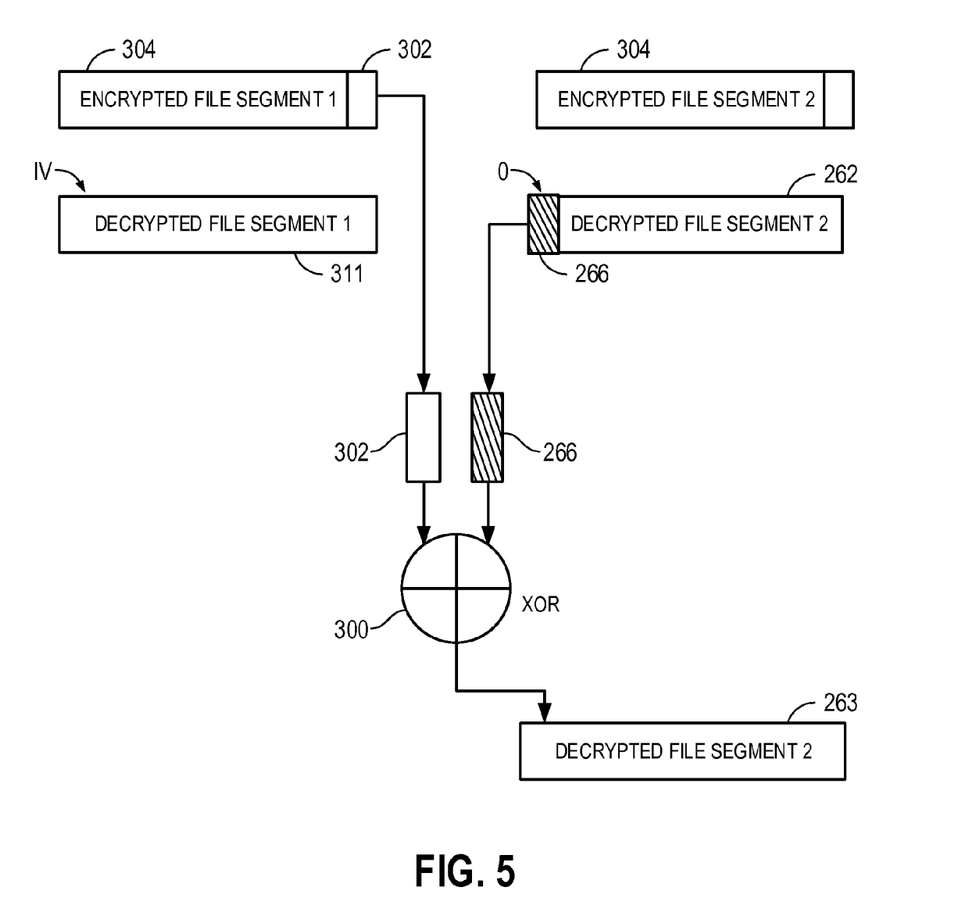
FIG. 5 illustrates an example of utilizing XOR operations to create fixed decrypted file segments.

With brief additional reference to FIG. 5, an example of utilizing a XOR operation 300 is shown. In particular, an XOR operation is performed in which the last block 302 of the previously read encrypted file segment 304 is XOR'd with the broken/first block 266 of the next decrypted file segment 262 (e.g., decrypted file segment 2) and the resulting file segment 2 263 is the result. In particular the first broken block 266 of decrypted file segment 262 is overwritten to create the fixed decrypted file segment 263 that thereafter may be utilized for secure boot decryption operations for an application. It should be appreciated that these same operations may be utilized in same manner thereafter for encrypted file segment 2 304, and thereafter as will be described.

Figure 6:
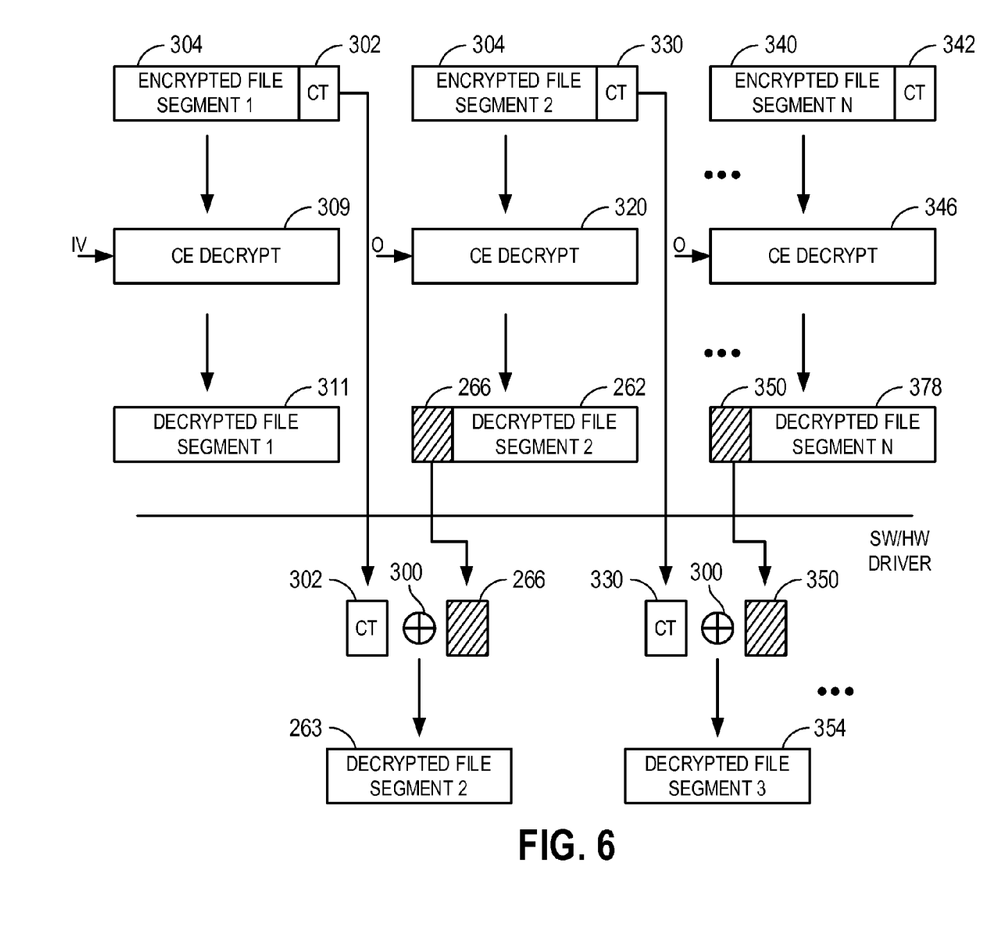
FIG. 6 illustrates a detailed example of creating fixed decrypted file segments.

With additional reference FIG. 6, a more detailed example of the previously described process will be presented. As can be seen in FIG. 6, a plurality of encrypted file segments are illustrated. As shown in FIG. 6, encrypted file segment 1 304 with a last ciphertext block (CT block) 302 is shown; an encrypted file segment 2 304 with a last CT block 330 is shown; and an encrypted file segment N 340 with a last CT block 342 is shown. As can be seen in operation, encrypted file segment 1 304 is decrypted utilizing a crypto-engine (CE) decrypt function 309 with an initialization vector (IV) resulting in a decrypted file segment 1 311. Further, encrypted file segment 2 304 is simultaneously decrypted via CE decryption function 320 with an input vector set to 0 resulting in a decrypted file segment 2 262 with a broken block 266. Simultaneously, the SW/HW driver XORs 300 the last CT block 302 of the previously read encrypted file segment 1 304 with the first broken block 266 of the next decrypted file segment 2 262 and overwrites the first block of this next decrypted file segment to create a fixed decrypted file segment 2 263. It should be appreciated that the last CT block may be attached at the end of its decrypted segment or delivered as part of the operation status or other metadata that relates to the segment. As can be seen FIG. 6, this continues for any number of encrypted files segments (1 ... N). As by way of illustration, continuing to a next encrypted file segment N 340, an encrypted file segment N 340 having a last CT block 342 may be decrypted by CE decryption function 346 with an input vector set to 0 resulting in a decrypted file segment N 378 with a first broken block 350. Similarly, and simultaneously, the SW/HW driver XORs the last CT block 330 of the previous encrypted file segment N with the first broken block 350 of the next decrypted file segment 378 and overwrites the first block of this next decrypted file segment to create a fixed decrypted file segment 3 354. It should be appreciated that this methodology may be utilized for any number of (N) of encrypted file segments to be decrypted.

Figure 7:
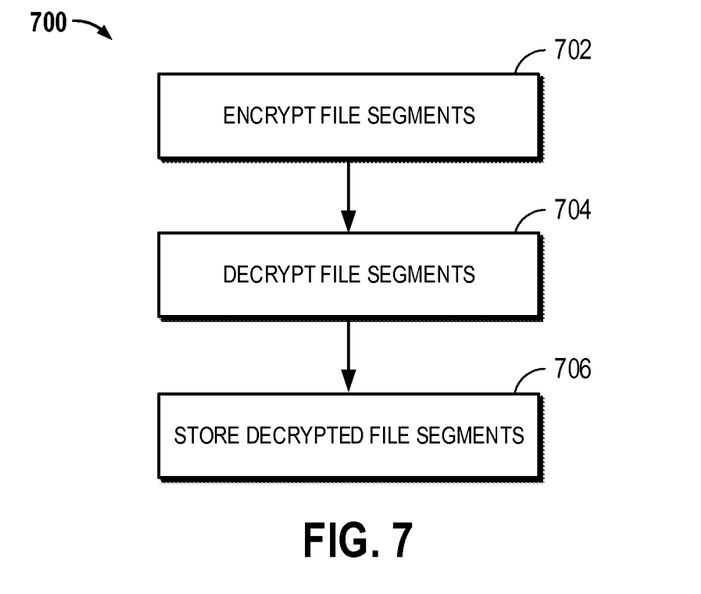
FIG. 7 is a flowchart illustrating a method to store decrypted file segments.

With brief additional reference FIG. 7, in one embodiment, aspects may be related to a method to store decrypted file segments. As one example, process 700 may include encrypting a plurality of file segments to store on a storage device (Block 702). Further, process 700 may include decrypting the plurality of file segments from the storage device through a crypto-engine in parallel fashion (Block 704). Moreover, process 700 may include storing the plurality of decrypted file segments in memory in parallel fashion (Block 706).

As previously described, aspects may relate to a system on a chip (SOC) for use with a storage device 125 of a computing device 100 in which a crypto-engine is hardware based and the SOC may implement a hardware and/or software driver to read decrypted file segments in a parallel fashion. For example, as previously described, the driver may be a software program that reads all of the fixed decrypted file segments in a parallel fashion and attaches them together. This functionality may be utilized, as an example, to allow for a secure boot decryption operation for an application to be booted up at the full speed that the hardware drive interface can provide.

It should be appreciated that aspects of the invention previously described may be implemented in conjunction with the execution of instructions (e.g., applications) by processor 110 of computing device 100 and/or SOC 202, as previously described. Particularly, circuitry of the device, including but not limited to the processor and SOC, may operate under the control of an application, program, routine, or the execution of instructions to execute methods or processes in accordance with embodiments previously described. For example, such a program may be implemented in firmware or software (e.g., stored in memory and/or other locations) and may be implemented by processors and/or SOCs and/or other circuitry of the devices. Further, it should be appreciated that the terms processor, chip, microprocessor, circuitry, controller, etc., refer to any type of logic or circuitry capable of executing logic, commands, instructions, software, firmware, functionality, etc.

The teachings herein may be incorporated into (e.g., implemented within or performed by) a variety of apparatuses (e.g., devices). For example, one or more aspects taught herein may be incorporated into a general computing device, a desktop computer, a mobile computer, a mobile device, a phone (e.g., a cellular phone), a personal data assistant, a tablet, a laptop computer, a tablet, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a server, a point-of-sale device, an entertainment device, a set-top box, or any other suitable device.

In some aspects a wireless device may comprise an access device (e.g., a Wi-Fi access point) for a communication system. Such an access device may provide, for example, connectivity to another network through transceiver (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

It should be appreciated that when the devices are mobile or wireless devices that they may communicate via one or more wireless communication links through a wireless network that are based on or otherwise support any suitable wireless communication technology. For example, in some aspects the wireless device and other devices may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, LTE Advanced, 4G, CDMA, TDMA, OFDM, OFDMA, WiMAX, and WiFi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a mobile wireless device may therefore wirelessly communicate with other mobile devices, cell phones, other wired and wireless computers, Internet web-sites, etc.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions or modules may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An integrated circuit for use with a storage device of a computing device comprising:
   a hardware interface to communicate with the storage device;
   a crypto-engine to encrypt file segments to be stored on the storage device and to decrypt file segments read from the storage device; and
   a processor configured to:
      read, in parallel, a plurality of decrypted file segments from the storage device through the crypto-engine, wherein the crypto-engine to decrypt the file segments in parallel, further comprising:
         read a last block of an encrypted file segment; and
         XOR the last block of the read encrypted file segment with a first block of a next decrypted file segment and overwrite the first block of the next decrypted file segment to create a fixed decrypted file segment; and
      store the plurality of decrypted file segments.

2. The integrated circuit of claim 1, wherein, the processor is further configured to store the fixed decrypted filed segment in memory.

3. The integrated circuit of claim 1, wherein, the processor is further configured to utilize a first initialization vector for a first file segment to be decrypted.

4. The integrated circuit of claim 3, wherein, the processor is further configured to set initialization vectors for subsequent file segments to be decrypted to a predefined number.

5. The integrated circuit of claim 1, wherein, the plurality of decrypted file segments are read to initiate a secure boot decryption operation for an application.

6. The integrated circuit of claim 1, wherein, the storage device includes at least one of a disk drive or flash memory.

7. A computing device comprising:
   a storage device; and
   an integrated circuit coupled to the storage device, the integrated circuit including:
   a hardware interface to communicate with the storage device;
   a crypto-engine to encrypt file segments to be stored on the storage device and to decrypt file segments read from the storage device; and
   a processor configured to:
      read, in parallel, a plurality of decrypted file segments from the storage device through the crypto-engine, wherein the crypto-engine to decrypt the file segments in parallel, further comprising:
         read a last block of an encrypted file segment; and
         XOR the last block of the read encrypted file segment with a first block of a next decrypted file segment and overwrite the first block of the next decrypted file segment to create a fixed decrypted file segment; and
      store the plurality of decrypted file segments.

8. The computing device of claim 7, wherein, the processor is further configured to store the fixed decrypted filed segment in memory.

9. The computing device of claim 7, wherein, the processor is further configured to utilize a first initialization vector for a first file segment to be decrypted.

10. The computing device of claim 9, wherein, the processor is further configured to set initialization vectors for subsequent file segments to be decrypted to a predefined number.

11. The computing device of claim 7, wherein, the plurality of decrypted file segments are read to initiate a secure boot decryption operation for an application.

12. The computing device of claim 7, wherein, the storage device includes at least one of a disk drive or flash memory.

13. A non-transitory computer-readable medium comprising code which, when executed by a processor, causes the processor of a computing device to perform operations comprising:
   read in parallel, a plurality of decrypted file segments from a storage device through a crypto-engine, wherein the crypto-engine to decrypt the file segments in parallel, further comprising
      read a last block of an encrypted file segment; and
      XOR the last block of the read encrypted file segment with a first block of a next decrypted file segment and overwrite the first block of the next decrypted file segment to create a fixed decrypted file segment; and
   store the plurality of decrypted file segments.

14. The non-transitory computer-readable medium of claim 13, further comprising code for storing the fixed decrypted filed segment in memory.

15. The non-transitory computer-readable medium of claim 13, further comprising code for utilizing a first initialization vector for a first file segment to be decrypted.

16. The non-transitory computer-readable medium of claim 15, further comprising code for setting initialization vectors for subsequent file segments to be decrypted to a predefined number.

17. The non-transitory computer-readable medium of claim 13, wherein, the plurality of decrypted file segments are read to initiate a secure boot decryption operation for an application.

18. The non-transitory computer-readable medium of claim 13, wherein, the storage device includes at least one of a disk drive or flash memory.

19. A computing device comprising:
   means for encrypting a plurality of file segments to store on a storage device;
   means for decrypting the plurality of file segments from the storage device in parallel;
   means for reading, in parallel, the plurality of decrypted file segments from the storage device through the means for decrypting the plurality of file segments, further comprising:
      means for reading a last block of an encrypted file segment; and
      means for XORing the last block of the read encrypted file segment with a first block of a next decrypted file segment and overwriting the first block of the next decrypted file segment to create a fixed decrypted file segment; and
   means for storing the plurality of decrypted file segments.

20. The computing device of claim 19, further comprising means for storing the fixed decrypted filed segment in memory.

21. The computing device of claim 19, further comprising means for utilizing a first initialization vector for a first file segment to be decrypted.

22. The computing device of claim 21, further comprising means for setting initialization vectors for subsequent file segments to be decrypted to a predefined number.

* * * * *